Nov. 3, 1959  A. G. MAKELA ET AL  2,910,716
WINDSHIELD CLEANER
Filed Sept. 19, 1955  2 Sheets-Sheet 2
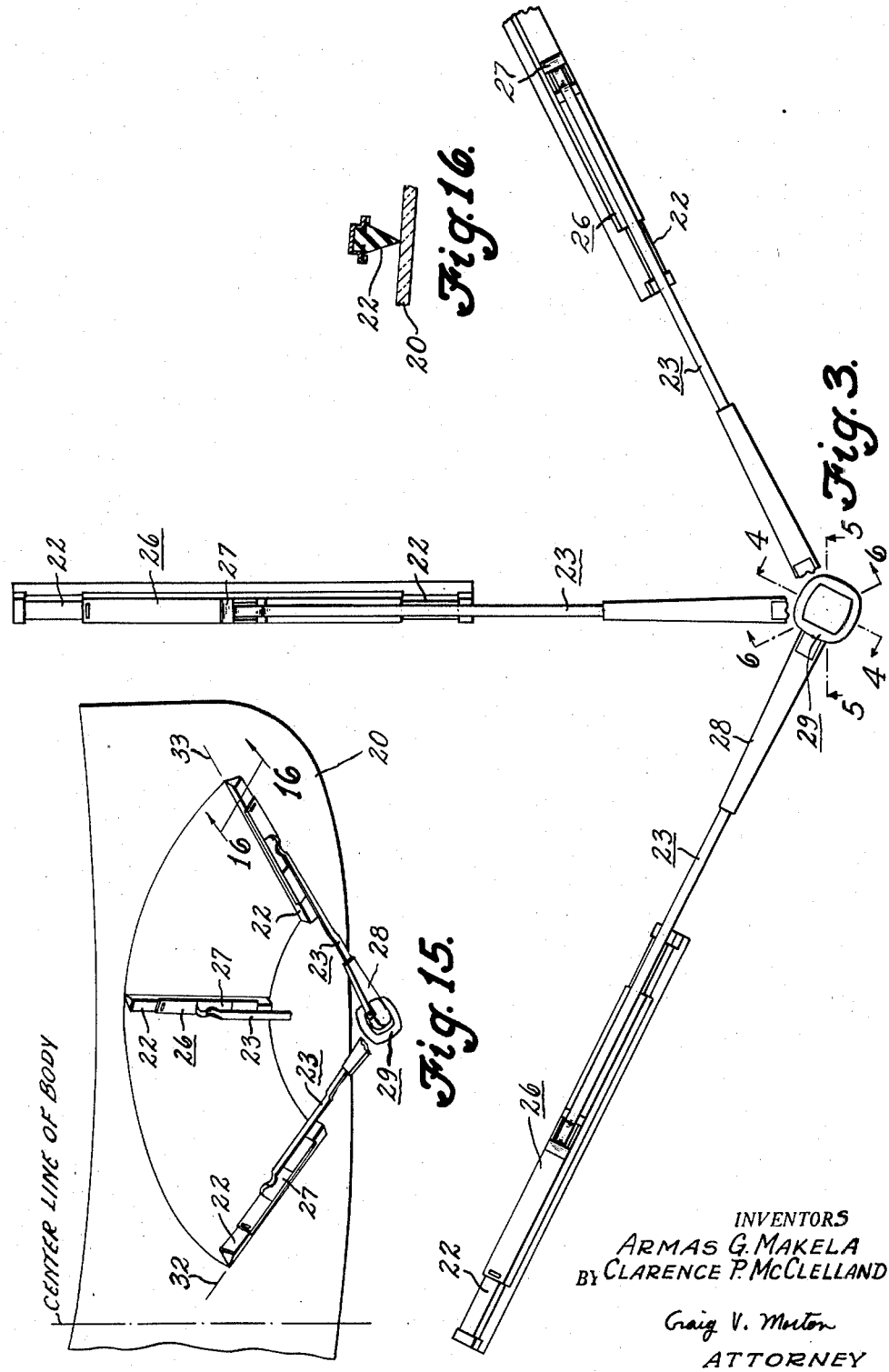
INVENTORS
ARMAS G. MAKELA
CLARENCE P. McCLELLAND
BY
Craig V. Morton
ATTORNEY

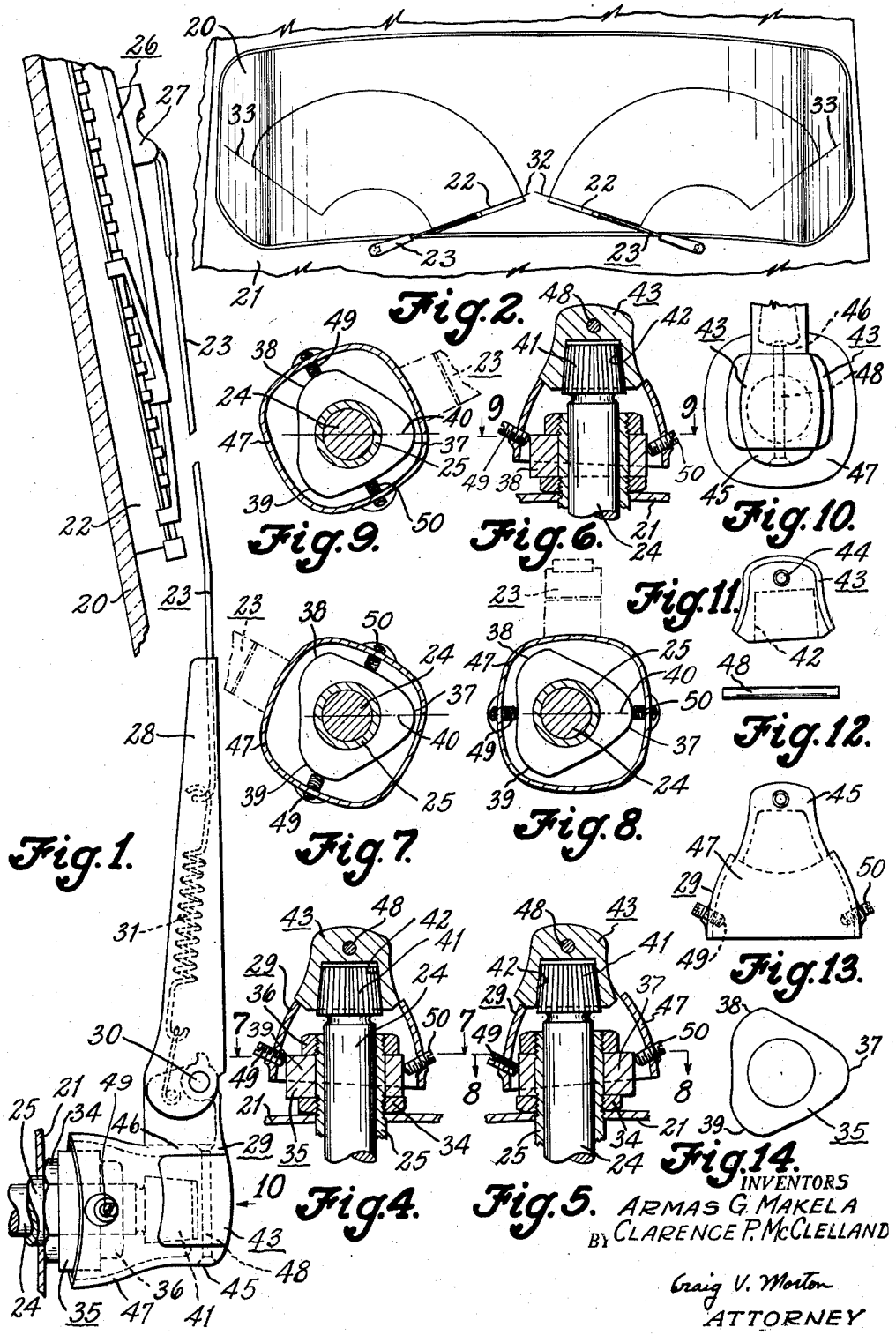

United States Patent Office 2,910,716
Patented Nov. 3, 1959

2,910,716
WINDSHIELD CLEANER

Armas G. Makela, Clawson, and Clarence P. McClelland, Royal Oak, Mich., assignors to General Motors Corporation, Detroit, Mich., a corporation of Delaware Application September 19, 1955, Serial No. 535,148

14 Claims. (Cl. 15—255)

This invention pertains to the art of windshield cleaning, and particularly to wiping means for curved vehicular transparencies.

Convention wiping apparatus is designed for wiping surfaces of simple curvature, and generally includes a flexible wiper blade and a wiper arm. The arm is detachably connected to a transmission shaft having a fixed axis, and, accordingly, only simple oscillatory motion is imparted to the arm and blade. This type of cleaning apparatus does not adequately clean vehicular transparencies having compound curvature, commonly known as wrap-around windshields, since the angular relationship between the blade and the windshield surface, or blade attitude, varies continuously as the blade traverses surfaces of different curvatures. In the present invention, the attitude of the blade and arm is automatically adjusted during oscillation so as to maintain a substantially constant angular relationship between the blade and windshield surface throughout the wiping stroke. More particularly, the arm is rocked about its longitudinal axis during its oscillatory stroke so as to maintain the blade substantially normal to the surface being wiped. Accordingly, among our objects are the provision of a windshield cleaner including means for imparting compound motion to the blade and arm thereof; the further provision of means for automatically rocking the wiper arm about its longitudinal axis during oscillation thereof; and the still further provision of cam actuated means for maintaining a wiper blade substantially normal to the curved surfaces traversed thereby throughout its wiping stroke.

The aforementioned and other objects are accomplished in the present invention by supporting a wiper arm for concurrent pivotal movement about its longitudinal axis and oscillation about the axis of a transmission shaft, which is substantially normal to the longitudinal arm axis. Specifically, the cleaning apparatus includes a transmission shaft which is journaled in a stationary transmission housing. A stationary cam having three angularly spaced lobes is fixedly connected to the transmission housing by a nut. The transmission shaft includes a serrated driving member, or burr, to which a swivel member having a complementary serrated socket is drivingly connected. The swivel member is formed with a diametral opening, the axis of which is substantially normal to the axis of the transmission shaft.

The wiper arm includes pivotally interconnected inner and outer sections together with a coil spring for biasing the outer arm section towards the windshield to apply wiping pressure to a flexible wiper blade detachably carried thereby. The inner arm section includes a socket supported on the swivel member for movement about the longitudinal arm axis constituted by a pin which interconnects the swivel member and the inner arm section. The inner arm section is formed with an integral skirt portion, which partially encloses the stationary cam and constitutes a weather shield therefor. Thus, the arm and blade are supported for rocking movement about the swivel member whereby the attitude, or angle of attack, of the wiper blade, may be automatically adjusted during the wiping stroke thereof so as to maintain the blade substantially perpendicular to the surface transversed thereby.

In order to impart compound movement to the wiper blade and arm assembly, the inner arm section carries a pair of diametrically opposed cam followers. The cam followers engage the stationary cam, and by reason of the three-lobe configuration of the cam, rocking movement is imparted to the arm about its pivotal connection with the swivel member during oscillation of the transmission shaft. Thus, the cleaner assembly is able to more adequately clean a wrap-around windshield.

Further objects and advantages of the present invention will be apparent from the following description, reference being had to the accompanying drawing wherein a preferred embodiment of the present invention is clearly shown.

In the drawing:

Fig. 1 is a fragmentary view, partly in section and partly in elevation, of a windshield cleaner assembly constructed according to this invention.

Fig. 2 is a fragmentary view, in elevation, of a vehicle equipped with the cleaner assembly of this invention.

Fig. 3 is a composite fragmentary view illustrating the wiper arm at the inboard stroke end, the high point of the stroke, and the outboard stroke end.

Figs. 4, 5 and 6 are enlarged sectional views taken along lines 4—4, 5—5 and 6—6 of Fig. 3, respectively.

Fig. 7 is a sectional view taken along line 7—7 of Fig. 4.

Fig. 8 is a sectional view taken along line 8—8 of Fig. 5.

Fig. 9 is a sectional view taken along line 9—9 of Fig. 6.

Fig. 10 is a plan view taken in the direction of arrow 10 in Fig. 1.

Fig. 11 is a side view, in elevation, of the swivel member.

Fig. 12 is a view, in elevation, of the pin for interconnecting the swivel member and the inner arm section.

Fig. 13 is a view, in elevation, of the inner arm section.

Fig. 14 is a view, in elevation, of the stationary cam.

Fig. 15 is a fragmentary composite view of the cleaner assembly and windshield, with the wiper arm and blade depicted in three positions.

Fig. 16 is a fragmentary sectional view taken along lines 16—16 of Fig. 15.

With particular reference to Figs. 1 through 3 of the drawings, a motor vehicle is depicted having a wrap-around windshield 20 and a cowl 21. Each half of the windshield, according to conventional practice, may be cleaned by a wiper assembly comprising a flexible blade 22 detachably carried by an arm 23 which is drivingly connected to an oscillatable transmission shaft 24. The transmission shaft 24 is rotatably journaled in a stationary housing 25, which projects through the cowl 21 of the vehicle and is fixedly attached thereto.

The wiper blade 22 may be of any conventional type and, thus, includes a pressure distributing assembly, generally designated by the numeral 26, carrying an arm attaching socket 27. The wiper arm 23 includes an outer arm section 28, one end of which is detachably connected to the blade socket 27, and the other end of which is connected to an inner arm section 29 by means of a transversely extending pin 30. In accordance with conventional practice, the outer arm section 28 is biased towards the windshield 20 to apply wiping pressure to the blade 22 by means of a coil spring 31, opposite ends of which are connected to the outer arm section 28 and the inner arm section 29.

The wiping stroke of the blade 22 is depicted in Fig. 2, the inboard stroke end position being indicated by line 32 and the outboard stroke end position being indicated by line 33. The wiper arm assembly of this invention automatically alters the attitude of the wiper blade 22 during movement of blade from the inboard stroke end position 32 to the outboard stroke end position 33. More particularly, Fig. 16 depicts the attitude of the blade 22 relative to the windshield surface 20 which is maintained throughout the entire wiping stroke. Thus, throughout the wiping stroke, the blade 22 is maintained substantially normal to the surface of the windshield 20, since it has been determined that the best wiping performance is achieved with the blade generally erect, or at a normal attitude. To accomplish this result, the wiper arm of this invention incorporates cam means for automatically adjusting the wiper arm about its longitudinal axis to maintain the normal blade attitude in accordance with the curved surface of the windshield.

With particular reference to Figs. 4 through 14, the transmission housing 25 is attached to the vehicle cowl 21 by means of a nut 34. A stationary cam 35, composed of a plastic, such as nylon, or an oilless bronze material, is mounted about the transmission housing 25 and is fixedly retained thereon by means of a nut 36. The cam 35 is formed with three angularly spaced lobes 37, 38 and 39 and is attached to the housing 25 with the lobe 37 being substantially bisected by horizontal line 40, which passes through the axis of the transmission shaft 24, as viewed in Figs. 7 through 9.

The projecting end of the transmission shaft 24 has permanently connected thereto a longitudinally serrated member, or drive burr, 41 which is disposed in a complementary serrated socket 42 of a swivel member 43. The swivel member 43 is also formed with a diametral opening 44 located substantially radial to the axis of the transmission shaft 24. The inner arm section 29 comprises a socket member having upstanding ear portions 45 and 46 and a bell-shaped skirt 47. The member 29 is telescopically disposed with respect to the swivel member 43 and is pivotally conected thereto by means of a pin 48, which extends through the opening 44 in the swivel member, opposite ends of the pin 48 being staked or otherwise suitably connected to the upstanding ears 45 and 46 of the socket member 29. The axis of the pin 48 constitutes the longitudinal axis of the arm 23. The depending skirt 47 of the socket member 29 extends in partially overlapping relation to the stationary cam 35 and, thus, constitutes a weather shield therefor.

The skirt 47 of the socket member 29 carries a pair of diametrically opposed cam followers 49 and 50, which in the illustrated embodiment are constituted by set screws. However, this showing is only exemplary, as it is readily apparent that the cam followers could be constituted by studs integral with the skirt 47 or rollers of any suitable material. The lower edges of the swivel member 43 and the upper edges of the cutout in the skirt 47 are suitably shaped to permit rocking movement of the socket member 29 relative to the swivel 43, as depicted in Figs. 4 through 6.

With particular reference to Figs. 4 through 9, 15 and 16, the operation of the improved windshield cleaner will be described. When the arm 23 is at the outboard stroke end position depicted by line 33 in Fig. 15, cam follower 49 will be in engagement with the high point of cam lobe 38, as depicted in Fig. 9. Accordingly, the socket member 29 will be angularly displaced in a clockwise direction relative to the swivel member 43, as depicted in Fig. 6, so as to maintain the blade 22 substantially at right angles to the surface of the windshield 20, as depicted in Fig. 16. During movement of the arm 22 by the shaft 24 to the mid-point of the wiping stroke, as depicted in Fig. 15, the socket member 29 will rotate in a counter-clockwise direction, as viewed in Fig. 9, to the angular position depicted in Fig. 8. During this movement, the socket member 29 is pivoted in the counter-clockwise direction about the longitudinal arm axis constituted by pin 48 from the position of Fig. 6 to the position of Fig. 5 so as to automatically alter the angular relationship between the arm 23 and the swivel member 43 to maintain the blade 22 normal to the surface of the windshield. In this position, follower 50 engages lobe 37 of the cam 35.

During movement of the arm 23 by the shaft 24 from the mid-point of the stroke to the inboard stroke end depicted by line 32, the cam follower 49 will move onto the high point of cam lobe 39, while cam follower 50 moves off the cam lobe 37 so that the socket member 29 will again move in a clockwise direction about a pivot 48 to assume the position depicted in Fig. 4. In so doing, the blade 22 will be maintained at a normal attitude relative to the curved windshield 20. The cam 35 is contoured in accordance with the curvature of the windshield surface 20 so as to maintain a substantially normal attitude of the blade 22 throughout the entire wiping stroke to thereby obtain optimum wiping performance of the blade 22.

From the foregoing, it is apparent that the present invention provides simple cam actuated means for rocking a wiper arm about a longitudinal axis during its wiping stroke. By rocking the arm about its longitudinal axis during its wiping stroke, a normal angular relationship between the wiper blade and the curved surface traversed thereby will be maintained. During oscillation of the wiper shaft, the blade carrying means of the arm assembly are rotated about the axis of pin 48, which extends lengthwise of the arm assembly and substantially radial to the wiper shaft, whereby the wiper blade will be rotated towards the cowl of the vehicle at the inboard stroke end and towards the header at the outboard stroke end, while during movement of the wiper blade from either the outboard or the inboard stroke end positions towards the mid-position, the blade will be rotated in the opposite direction. In other words, if the right-hand side of the windshield is viewed from outside the body, the blade carrying means will rotate in the clockwise direction as the blade moves to the outboard stroke end position, counterclockwise direction as the blade moves from the outboard stroke end position to the mid-position, clockwise as the blade moves from the mid-position to the inboard stroke end position, and counterblockwise as the blade moves from the inboard stroke end position back to the mid-position. Moreover, in the cleaner assembly of the present invention, the cam means are shielded from the weather so as to prevent malfunctioning thereof due to accumulation of snow, sleet, or ice between the cam and the cam followers.

While the embodiment of the present invention as herein disclosed, constitutes a preferred form, it is to be understood that other forms might be adopted.

What is claimed is as follows:

1. A windshield cleaner comprising, a wiper blade for use on a curved windshield, an oscillatable shaft, said wiper blade being operatively connected to said oscillatable shaft by means of an arm having a pivot with an axis extending lengthwise thereof and substantially radial to said shaft, position controlling cam means including cooperating cam and cam follower parts operating automatically with the angular position of said shaft for controlling the pivoted position of said arm, and weather shielding means carrying one of said parts and enclosing the other part of said position controlling cam means.

2. A windshield wiper arm assembly comprising, a member having means for mounting the assembly on a drive shaft, an inner section circumscribing said member, a pin rotatably journalled in said member and attached to said inner section whereby said inner section is pivotally supported for movement about the longitudinal axis of said arm assembly, and a blade carrying section hinged to said inner section, the axis of said hinge being arranged substantially transversely of said longitudinal axis.

3. A windshield cleaner comprising, a wiper blade for use on a curved windshield, a wiper arm, said arm including an inner section operatively connected to said shaft so as to be oscillated thereby and having a pivot with an axis extending lengthwise thereof and substantially radial to said shaft and means interconnecting said inner arm section and said blade, and position controlling cam means including cooperating cam and cam follower parts operating automatically with the angular position of said shaft for controlling the pivoted position of said arm, said inner arm section including a weather skirt carrying one of said parts and enclosing the other part of said position controlling cam means.

4. A windshield cleaner comprising a wiper blade for use on a curved windshield, an oscillatable shaft, an arm for carrying said blade having a connection with said shaft and having a pivot on an axis extending lengthwise of the arm and substantially radial to said oscillating shaft, position controlling means including cooperating cam and cam follower parts operating automatically with the angular position of said shaft for controlling the pivoted position of said blade carrying means to maintain the blades substantially normal with the windshield, and weather shielding means carrying said cam follower part and enclosing the cam part of said positioned controlling cam means.

5. A windshield cleaner for wiping a curved windshield including, an oscillatable drive shaft having a fixed axis, an arm assembly connected to said shaft so as to be oscillated thereby, a wiper blade carried by a portion of said arm assembly, means supporting said blade carrying portion of said arm assembly for pivotal movement on an axis extending lengthwise of the arm and substantially radial to said shaft, position controlling cam means including cooperating cam and cam follower parts operable automatically upon oscillation of said shaft for controlling the pivotal position of said blade carrying portion of said arm assembly to maintain the blade substantially normal to the windshield, and weather shielding means carrying said cam follower part and enclosing said cam part said position controlling cam means.

6. A windshield cleaner for wipping a curved windshield including, an oscillatable shaft, an arm assembly connected to said shaft so as to be oscillated thereby, said arm assembly comprising a member mounted on said shaft, an inner arm section circumscribing said member, a pin rotatably journalled in said member and attached to said inner section whereby said inner section is pivotally supported for movement about an axis radial to said shaft, and a blade carrying section connected to said inner section, a wiper blade carried by said blade carrying section, and cam means operatively associated with said inner arm section for rocking said inner arm section about said axis during oscillation of said arm by said shaft to maintain the blade substantially normal to the windshield.

7. A windshield cleaner for wiping a curved windshield including, an oscillatable shaft, an arm assembly connected to said shaft so as to be oscillated thereby, said arm assembly comprising a member mounted on said shaft, an inner arm section circumscribing said member, a pin rotatably journalled in said member and attached to said inner section whereby said inner section is pivotally supported for movement about an axis radial to said shaft, and a blade carrying section pivotally connected to said inner section, a wiper blade carried by said blade carrying section, a stationary cam supported about said shaft, and cam follower means carried by said inner arm section and engaging said cam for effecting pivotal movement of said inner arm section during oscillation of said shaft to maintain the blade substantially normal to the windshield.

8. The cleaner set forth in claim 7 wherein said oscillatable shaft is rotatably mounted within a fixed housing, wherein said stationary cam is attached to said fixed housing, and wherein said inner arm section includes a skirt portion constituting a weather shield for said cam.

9. A windshield wiper arm assembly comprising, a member having means for connecting the assembly to a drive shaft, an inner section circumscribing said member, a pin rotatably journalled in said member, and attached to said inner section whereby said inner section is pivotally mounted for movement on an axis extending lengthwise of the arm assembly and radial to said shaft, and a blade carrying section spring hinged to said inner section, the axis of said hinge being arranged substantially transversely of said lengthwise axis.

10. A windshield wiper arm assembly including, a swivel member adapted for connection to a drive shaft, a socket section circumscribing said swivel member and pivotally connected thereto by a pin, the axis of which extends lengthwise of the arm assembly and is located at an angle to the drive shaft, and a blade carrying section connected to said inner section.

11. A windshield wiper arm assembly comprising a swivel member adapted for attachment to a drive shaft, a socket section circumscribing said swivel member and pivotally connected thereto by means of a pin extending lengthwise of the arm assembly and substantially radial to the drive shaft, and a blade carrying section spring hinged to said socket section with the hinge axis arranged substantially transversely of the lengthwise arm pin.

12. A windshield cleaner for wiping a curved windshield including, a wiper blade, arm means carrying said blade and arranged to pivot said blade relative to the windshield about an axis extending lengthwise of the arm means, an oscillatable shaft, means connecting said blade carrying arm means to said shaft so as to be oscillated thereby, cam means including cooperating cam and cam follower parts automatically operable to pivot said blade carrying arm means during oscillation of said shaft, and weather shielding means carrying one of said parts and enclosing the other part of said cam means.

13. A windshield cleaner for wiping a curved windshield including, a stationary support, an oscillatable shaft journalled in said support, a multiple lobe cam attached to said support and circumscribing said shaft, a wiper blade, a swivel member drivingly connected to said shaft, and an arm assembly having blade carrying means pivotally connected to said swivel member along an axis extending lengthwise of the arm assembly and substantially radially of the shaft, said arm assembly including a pair of diametrically opposed cam followers engageable with said cam for pivoting said blade carrying means relative to said swivel member during oscillation of said shaft.

14. A windshield cleaner for wiping a curved windshield including, a stationary support, an oscillatable shaft journalled in said support, a three lobe cam attached to said support and circumscribing said shaft, a wiper blade, a swivel member attached to said shaft for oscillation therewith, and an arm assembly having blade carrying means pivotally connected to said swivel member along an axis extending lengthwise of the arm assembly and substantially radially of the shaft, said arm assembly including a pair of diametrically opposed cam followers engageable with the lobes on said cam for pivoting said blade carrying means relative to said swivel member during oscillation of said shaft.

References Cited in the file of this patent

UNITED STATES PATENTS

| 2,412,319 | Carey | Dec. 10, 1946 |
| 2,691,186 | Oishei et al. | Oct. 12, 1954 |